Dec. 4, 1956 P. M. MUSPRATT 2,772,467
MOLDING APPARATUS
Filed Aug. 6, 1951 5 Sheets-Sheet 2
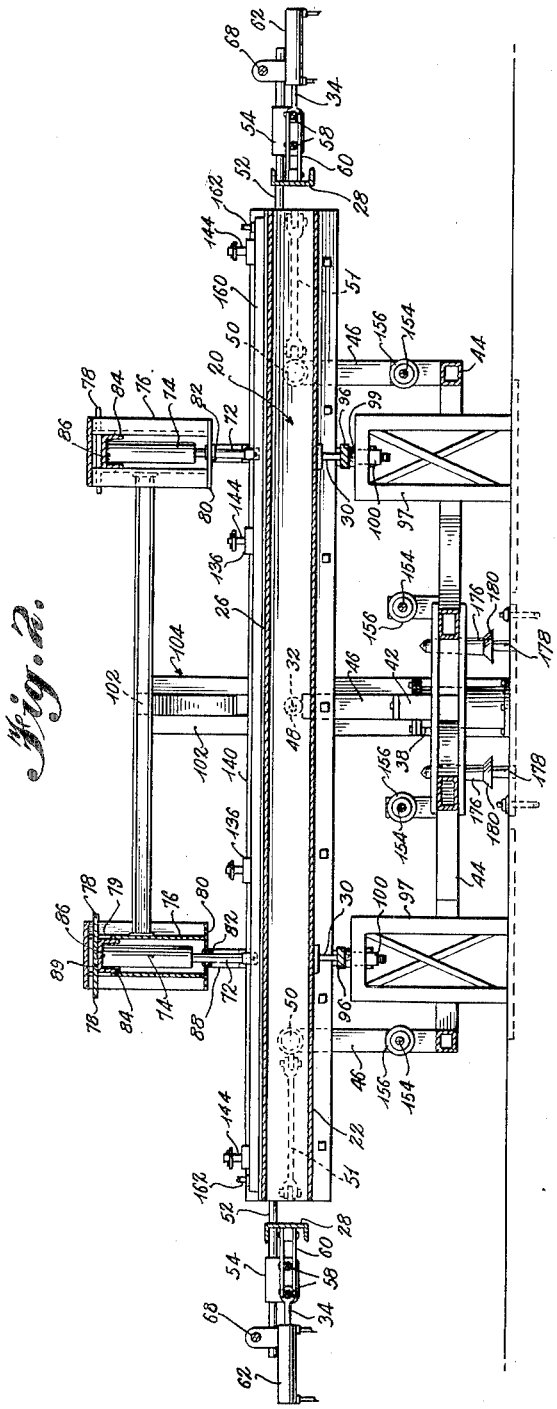
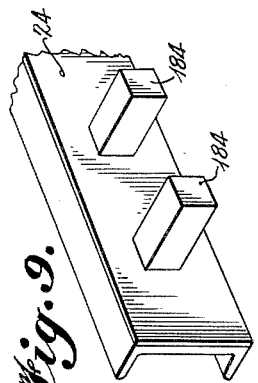
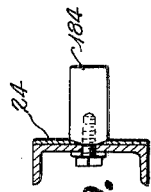
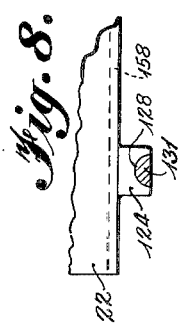
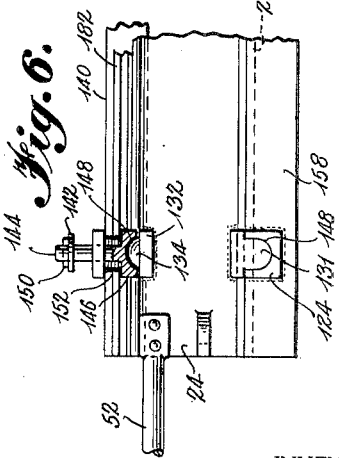
INVENTOR
Paul M. Muspratt
BY Stevens, Davis, Miller and Mosher
ATTORNEYS

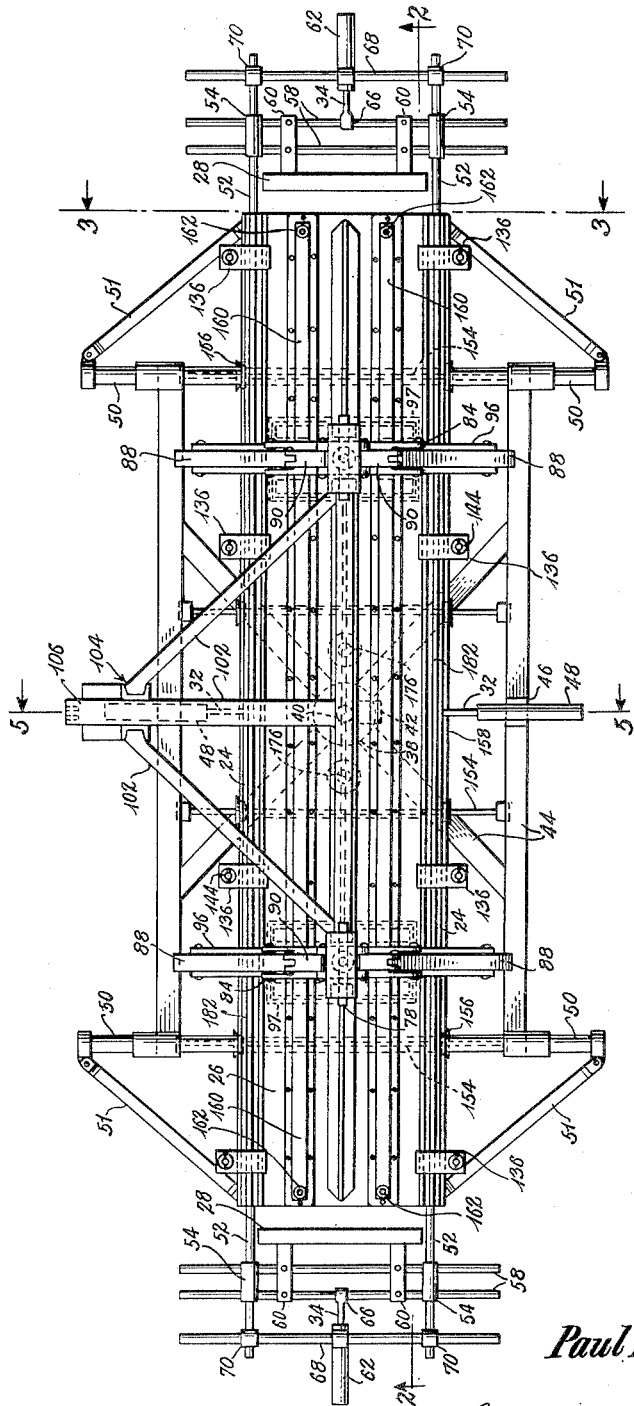

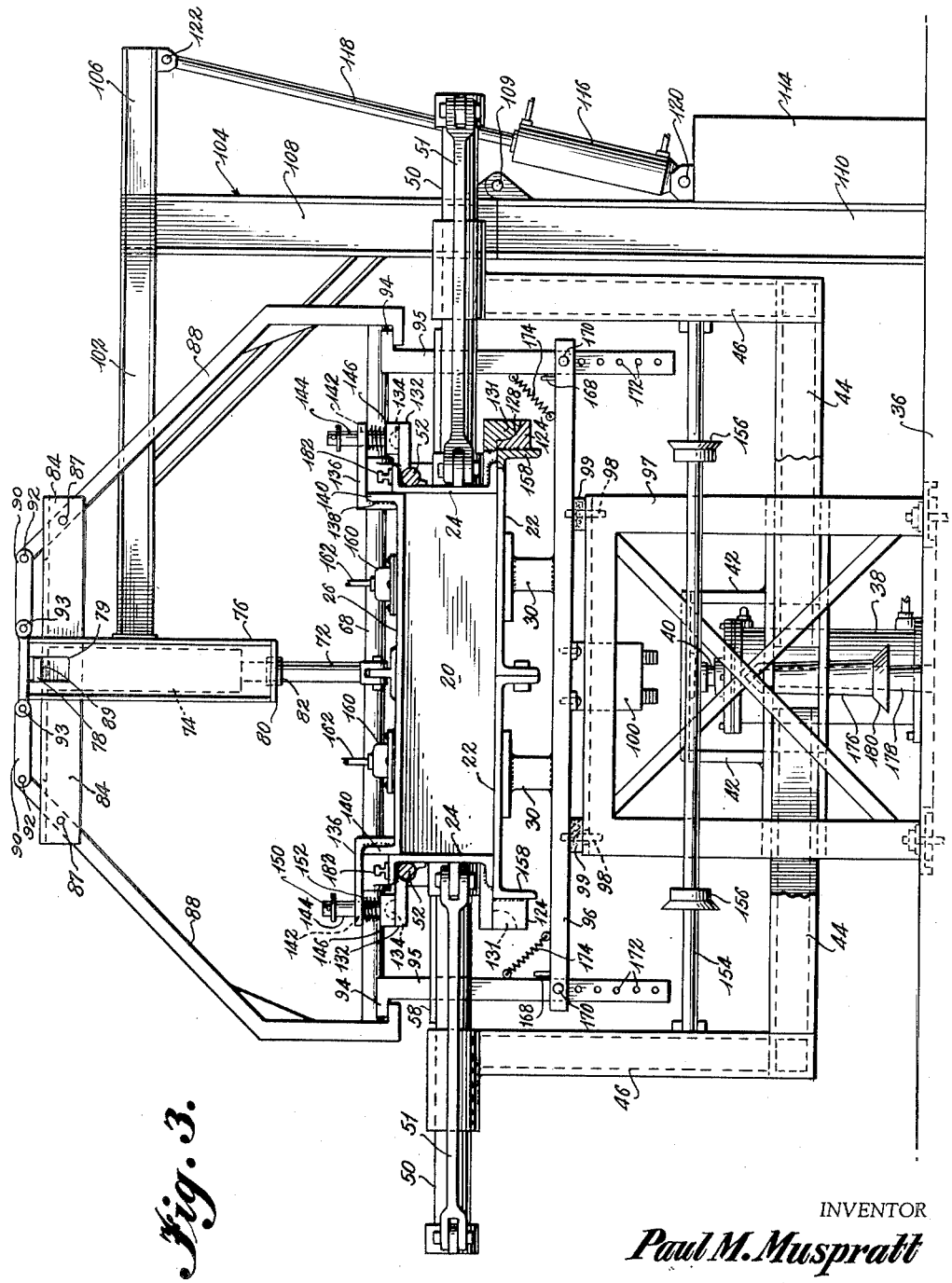

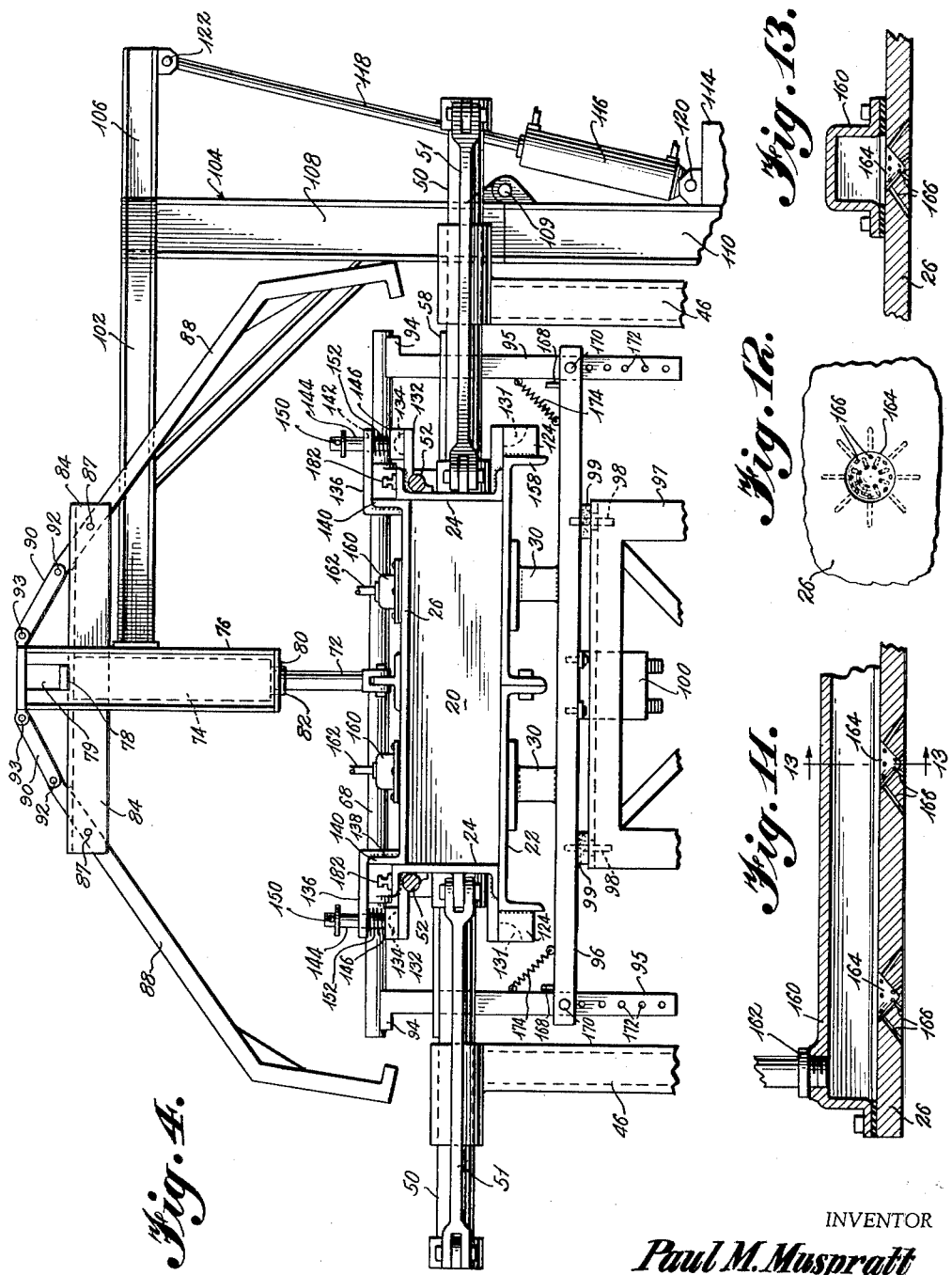

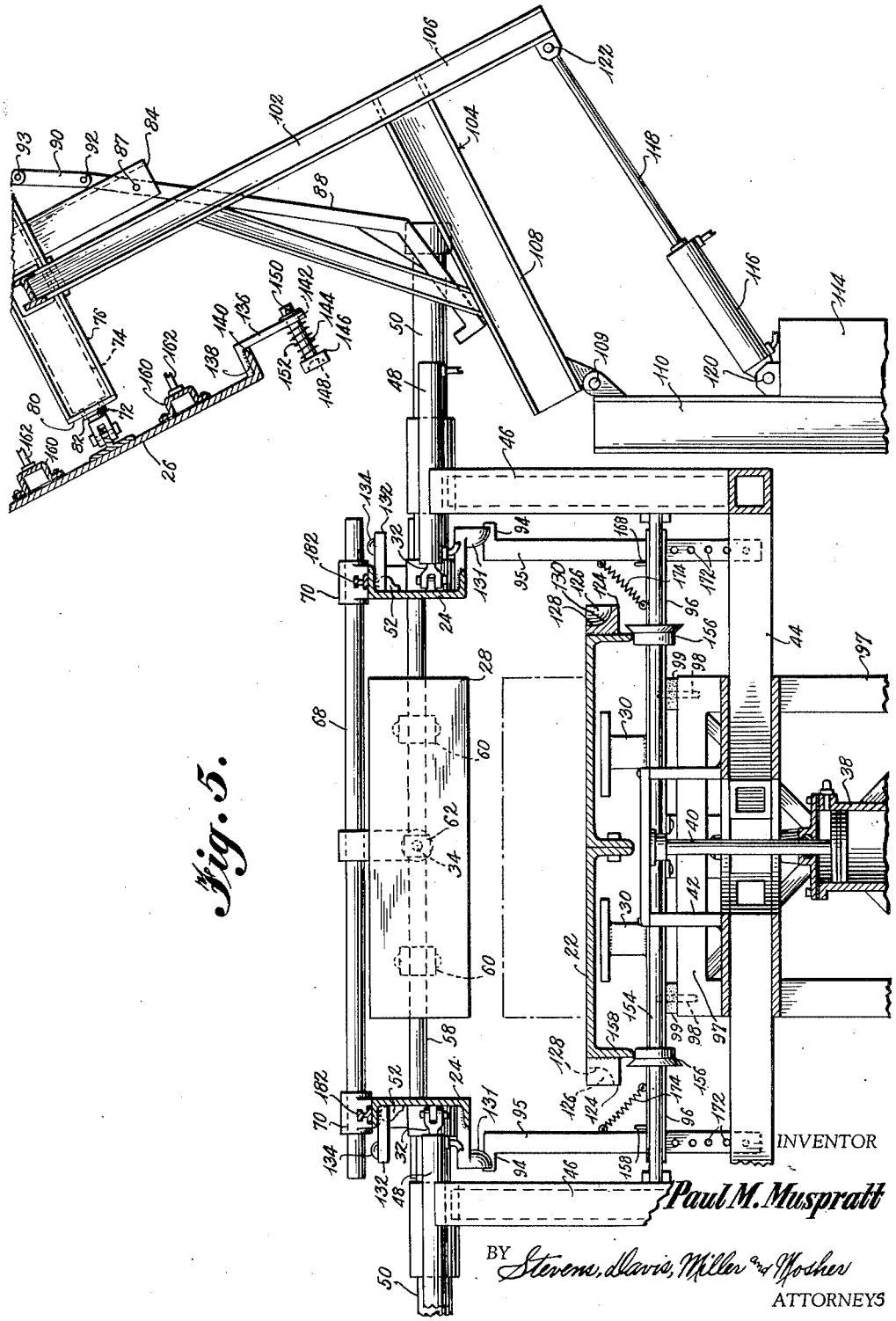

United States Patent Office 2,772,467
Patented Dec. 4, 1956

2,772,467

MOLDING APPARATUS

Paul M. Muspratt, Kingston, Pa.

Application August 6, 1951, Serial No. 240,493

16 Claims. (Cl. 25—41)

This invention relates to molding apparatus and is particularly concerned with casting or molding concrete products.

In my copending applications Serial Number 176,001, filed July 26, 1950, and Serial Number 176,002, filed July 26, 1950, inventions are set forth employing especially designed concrete load supporting elements, which inventions in practice require a large number of elements of varying size and structural design. Complete enjoyment of those inventions, in a large scale commercially practical sense, necessitates a low-cost efficient and highly accurate means for producing these elements, as a large scale operation will utilize tens of thousands of precision made elements. While presently available molding apparatus can supply the quantitative requirements, it cannot do so without considerable waste of man power and an undesirably large investment in casting or molding forms. Moreover, only by tedious, time-consuming methods, employing expensive heavy duty equipment, can precision elements be made.

I have discovered that by employing an apparatus of the type herein described and illustrated that it is possible to achieve many advantages and results not heretofore conceived or realized as attainable. This invention affords great savings in man power, it being possible for one man using this invention to produce the equivalent of many using other types of molding equipment. This is accomplished with concurrent savings in time as the invention permits a rapid operation not possible with other equipment. The investment in equipment is greatly reduced as the products of this invention do not require setting forms which in the present practices of the industry are tied up for many hours in the production of a single product. These are only a few of the advantages afforded by this invention. Others will appear as the description proceeds.

The present invention is not limited to casting only those elements employed in my referred-to copending applications; on the contrary, it is capable of casting any type of product, whether it be of concrete or other material and without regard to the use of the product.

Among the objects of this invention are the following:

To provide a molding apparatus which will be capable of casting various types of plastic material of any desired form;

To provide a molding apparatus which will cast products of uniform size, density and with a great degree of accuracy of dimensions throughout each product;

To provide a molding apparatus which will cast products having smooth surfaces and without ragged edges and to thus prevent loss in rejected products;

To provide a molding apparatus which will require a minimum amount of fixed equipment periodically tied up in the setting operation and which will effect great savings in time in the overall molding operation;

To provide a molding apparatus which may be operated by a single individual throughout a complete molding operation;

To provide a molding apparatus which will entirely eliminate the physical removal of casting forms from the set material and which will not require the usual confining form during the setting period;

To provide a molding apparatus which will localize vibratory motion that is applied for settling of the material being molded to the area immediately surrounding the molding zone.

Figures 1 through 13 illustrate the invention wherein:

Figure 1 is a top plan view;

Figure 2 is a side view in elevation taken on the line 2—2 of Figure 1, and is partly in section;

Figure 3 is an end view in elevation taken on the line 3—3 of Figure 1 showing the apparatus with a portion of the end structure removed;

Figure 4 is a fragmentary view taken on the line 3—3 of Figure 1 showing the apparatus in one of its operating positions;

Figure 5 is a fragmentary sectional end view taken on the line 5—5 of Figure 1, showing the device in still another operating position;

Figure 6 is a fragmentary view of a side wall showing positioning elements partly in section;

Figure 7 is a top view of Figure 6;

Figure 8 is a fragmentary view of a pallet carrying a positioning element;

Figure 9 illustrates core-members associated with a side wall of the invention;

Figure 10 is a sectional view through Figure 9;

Figure 11 is a lengthwise fragmentary sectional view vertically through the top illustrating air evacuating means;

Figure 12 is a fragmentary top view of the top showing a countersink and bores with the channel-forming element in Figure 11 removed; and, Figure 13 is a sectional view through Figure 11 on the line 13—13.

Referring to the drawings, and particularly to Figure 3, numeral 20 denotes a casting chamber which comprises a base pallet denoted by numeral 22, a pair of sidewalls denoted by numeral 24, a top closure denoted by numeral 26 and a pair of endwalls denoted by numeral 28, the endwalls appearing best in Figure 2 in retracted position. The pallet is seated upon several small stands (four being shown) denoted by numeral 30. Stands 30 in turn rest upon a pair of spaced vibrating tables that are anchored in the base and which are more fully described at a later point herein. The pallet simply seats upon these vibrating members and it is not rigidly attached thereto at any time.

Each endwall and the sidewalls are carried and manipulated by hydraulic pistons denoted by numerals 32 and 34, respectively, which are best illustrated in Figures 5 and 1, respectively. As will later be seen, manipulation of the hydraulic pistons position the side and endwalls with respect to the pallet after it is seated upon the vibrators, thus forming the basic shape of the casting chamber.

The general framework of the apparatus and its relationship to the hydraulic chamber will now be described beginning with the base member which supports the entire structure. Before referring to this, however, it is desired to point out and make clear at this juncture that the vibrating elements are in no way attached to the casting chamber or its pallet, nor are they attached to any portion of the general framework of the apparatus. They are simply seated upon a firm foundation and positioned within the framework to receive the stands which support the casting pallet.

Numeral 36 in Figure 3 denotes a base member which may be constructed of concrete, steel or wood. Located centrally of the base and firmly anchored thereto is a hydraulic jack denoted by numeral 38. The piston of the jack is denoted by numeral 40, to which is attached a box-like cage denoted by numeral 42. Numeral 44 denotes a reinforced box-type frame which is attached to the cage 42 and extends horizontally therefrom. It will thus be seen that the frame 44 will be moved upwardly or downwardly as the piston 40 is manipulated, and further that all elements which are attached to the frame member 44 will be carried therewith. Figure 5, in contrast to Figure 3, illustrates the position of the structure when the jack is extended.

Attached to the base frame 44 are a number of stanchions denoted by numeral 46. These stanchions are located along the length of the frame. To the central most stanchion and at the top thereof, and on each side of the frame, is attached an hydraulic unit denoted by numeral 48. Hydraulic units 48 actuate pistons 32 which, as before described, are attached to the sidewalls of the casting chamber. It will thus be understood that the sidewalls of the casting chamber may be manipulated horizontally by the actuation of the hydraulic units 48 and may also be manipulated vertically as they are attached to the hydraulic units which are carried by the stanchion which are in turn carried by the base frame 44, the base frame being moved vertically by operation of the hydraulic jack. The desirability of the vertical movement for the sidewalls will appear as the description proceeds.

It will of course be understood that several hydraulic pistons and units may be affixed to stanchions along the length of the sidewall and that only one such unit for each side is shown for simplicity of illustration and description. A plurality of sleeve-type guides, denoted by numeral 50, and best illustrated in Figure 1, are attached atop the other stanchions and to the sidewalls of the casting chamber. Extending from these guides are braces denoted by numeral 51.

The structure which carries and manipulates the endwalls of the casting chamber will now be described. Before proceeding, however, it is desirable to point out that all of the endwall supporting and manipulating structure is attached to and supported by the sidewalls on the outside thereof, of the casting chamber. It will thus be appreciated that when the sidewalls are moved vertically, the endwalls travel therewith. As the end structure on both ends of the apparatus is identical, reference will be made to only one of such ends.

Referring to Figures 1 and 2, numeral 52 denotes guide rods which are securely attached to the sidewalls 24 on their outside. As can be seen, these guide rods extend horizontally a substantial distance outwardly from the sidewalls and in the same line therewith. Mounted on each guide rod is a 90° double journal sliding box denoted by numeral 54. The boxes are mounted on the guide rods in the upper bearing surface which runs lengthwise of each box. Each box contains two laterally-running lower bearing surfaces in which are mounted a pair of centering rods denoted by numeral 58. As can be seen in the drawings, these centering rods carry the endwall 28 of the casting chamber. The endwall is attached to supporting members denoted by numeral 60, which supporting members are provided with laterally-running bearing surfaces through which the centering rods are passed. It will thus be understood that the end wall is free to move toward and away from the sidewalls upon guide rods 52, and that guide rods 52 and the sidewalls can move horizontally with respect to the remaining endwall supporting and manipulating structure.

An hydraulic unit is provided to effect this movement, the hydraulic unit being denoted by numeral 62 and its piston denoted by numeral 34. Piston 34 is attached to one of the centering rods through a journal bearing denoted by numeral 66. Hydraulic unit 62 is carried by a cross bar denoted by numeral 68, which cross bar in turn is carried in the upper bearing surface of a pair of double journal sliding boxes denoted by numeral 70. Sliding boxes 70 are mounted upon guide rod 52 in their lower bearing surfaces.

Sliding boxes 70 are locked securely in position upon guide rods 52 when pressure is in the hydraulic cylinders. Actuation of pistons 34 will effect movement of the endwall into position relative to the sidewalls of the casting chamber, the backward thrust of the hydraulic unit being taken by the cross bar to which it is attached.

The top 26 of the casting chamber is manipulated by a pair of hydraulic units in a fashion similar to that described in connection with the walls of the casting chamber. As can be seen in Figure 2, the top is directly attached to a pair of pistons denoted by numeral 72. Pistons 72 are actuated by hydraulic units denoted by numerals 74. Each hydraulic unit is suspended in a cage denoted by numeral 76, and as each is identical in detail and relation to the top, only one will be referred to in the following description. Cage 76 is supported in a manner hereinafter described.

Hydraulic unit 74 is provided with a pair of laterally-directed fingers denoted by numeral 78, which extend into slots provided in the walls of cage 76. The slots are denoted by numeral 79 and permit sliding movement of the fingers 78 therein. Adjacent the bottom of cage 76 there is a suitably-mounted spider denoted by numeral 80 which supports a cylindrical guide member denoted by numeral 82 in which piston 72 travels. Vertical movement of the piston is thus maintained. Before proceeding further, it should be clearly understood that the sole purpose of cages 76 is to provide a guiding support for the hydraulic units; as will be presently explained, the hydraulic units do not exert any thrust upon the cages when pressure is applied to the top of the casting chamber.

A pair of arms denoted by numeral 84 also extends from hydraulic unit 74. These arms are provided by an inverted steel channel welded to the top of the hydraulic unit as can be seen in Figure 2 at numeral 86. Fingers 78 are provided by a steel bar which is welded to the steel channel as at numeral 89.

Pivotally mounted upon arms 84 and cage 76 is a mechanical system composed of elements which transfer the upward thrust of hydraulic unit 74 to points beneath the casting chamber pallet. This mechanical system is composed of oppositely positioned elements or links extending from opposite arms, the hydraulic unit and cage being positioned in a manner to equally distribute the thrust between each side of the system. Each component of the system includes two links denoted by numerals 88 and 90, respectively, which are pivotally connected as indicated at numeral 92. The lower end of link 88 is L-shaped and locks underneath a lug denoted by numeral 94 carried on a vertically adjustable bar denoted by numeral 95. Bar 95 in turn is pivotally mounted upon a cross bar denoted by numeral 96, which cross bar may be regarded as forming a part of vibrating table now to be described.

The vibrating tables (of which there are at least two) include a frame denoted by numeral 97 which is anchored in the base in any suitable manner. Cross bar 96 is bolted to this frame lengthwise thereof as at numeral 98. However, the frame and cross bar are separated by rubber spacers or cushions denoted by numeral 99. All of this can be seen best in Figures 3 and 5, and it will be observed that the bolts which attach the cross bar 96 to the frame 97 pass through the cushions 99. The bolts are not drawn down tight such as to compress the cushions, but instead are simply drawn down enough to hold the cross bar in proper seated position upon the cushions while leaving in the cushions their full resiliency so that they may function to prevent vibratory motion from being transmitted below the top of the frame 97. Attached to cross bar 96 is a vibrator denoted by numeral 100, the function of which is well understood to be the generation of shock waves that are ultimately transmitted to a plastic mass for the purpose of settling it to a highly compact body.

It is believed that it will be clear from the immediately preceding description of the vibratory apparatus that vibrations will be retained above the vibratory table. It is now desired to return to the description of the locking mechanism which has the complementary function of changing the direction of upwardly-moving vibratory waves to downwardly-moving waves, thus localizing the entire vibratory forces within the imaginary space defined circumferentially by the locking mechanism and the cross bar underneath the pallet, and longitudinally by the length of the pallet. In other words, the vibratory force is retained substantially entirely within this tunnel-shaped space. The force is not transmitted to the cage support and thence throughout the supporting base. There is, of course, a small amount of vibratory motion imparted to the hydraulic units which manipulate the side and endwalls, which is then in turn transmitted to the whole frame through the stanchions. However, it will be recalled that the frame is mounted upon a hydraulically-operated piston which acts to cushion and reverse the vibrations. In any event, the motion so transmitted is negligible as it is vertical in direction and therefore largely by-passes the sidewalls.

When first the top is positioned on the concrete mass and no pressure is being applied thereto, the hydraulic chamber is in a position of repose upon the piston, it having moved downwardly because of its own weight and that of the locking mechanism. At that time the locking mechanism has become disengaged and assumes the position illustrated in Figure 4. It will be observed that pivot points 87, 92 and 93 lie substantially in a straight line, pivot point 92 being slightly above the line joining pivots 87 and 93 so that whenever the mechanism is actuated to locking position, pivot 92 will move upwardly, thus causing link 88 to move toward locking poistion.

Link 90, it will be observed, is pivoted upon cage 76 at numeral 93. The function of this link is to effect movement of link 88 to and from locking position as the hydraulic unit moves upwardly and downwardly in the cage.

In bringing the mechanism into locking engagement from the position shown in Figure 4, pressure is introduced into hydraulic cylinder 74, which reacts in the path of least resistance, namely, to back the cylinder up on the piston, carrying with it arms 84. As arms 84 move upwardly, pivot point 92 is broken from the position shown in Figure 4, and proceeds to that of Figure 3, at which time link 88 is engaged with lug 94. At this point, arms 84 can no longer move upwardly, due to the fact that link 88 (to which the arms are pivoted) is securely held by lugs 94, and the upward thrust of the hydraulic unit is being taken by bars 95 which are fixed to cross bar 96. The reaction in the cylinder 74 is thereafter downwardly upon the piston 72 which presses the top of the casting chamber down upon the concrete mass and begins to give the mass its ultimate form.

Two important accomplishments of this invention should be observed at this point. First, inasmuch as cage 76 is completely isolated from the thrust of the cylinder which it guides, no forces are transmitted to struts 102 which support the cage. This means that struts 102 will remain in perfect horizontal position and will not in any way tend to cause the top of the casting chamber to assume anything but its intended level position as it otherwise would were it receiving the thrust. Secondly, assuming the vibrator to be in motion, a minimum of vibratory force and motion is dissipated and transmitted through the struts to the base of the apparatus as its only path of travel is through link 90. Such vibrations as do pass through this link are negligible and even this can be eliminated by providing a floating or slotted pivot point at 92 and a cam on link 88, the cam coacting with lug 94 to disengage link 88 when arms 84 move downwardly at the time pressure in the cylinder is released.

The cages which are denoted by numeral 76 and which support the hydraulic units that actuate the pistons and manipulate the top of the casting chamber are supported by horizontally extending struts denoted by numeral 102. Struts 102 are mounted on a vertical stanchion denoted by numeral 104 and the central strut extends horizontally for some distance beyond the stanchion on the side opposite to the location of the hydraulic units and cages as numeral 106. Stanchion 104 is in two pieces, the top piece which is denoted by numeral 108 being pivoted, as at numeral 109, to the lower section denoted by numeral 110. The stanchion is firmly attached to the base that is provided for the structure. Numeral 114 denotes a rigidly mounted block adjacent the stanchion section 110. Numeral 116 and numeral 118 denote an hydraulic unit and piston, respectively. The hydraulic unit 116 is pivotally attached to block 114 as shown in the drawings and designated as numeral 120. At the opposite end, piston 118 is pivotally attached to strut 102 as indicated at numeral 122. Actuation of this hydraulic unit effects movement of the casting chamber top to and from its position above the casting chamber. As can be seen in Figure 5, the top 26 has been drawn away from the chamber.

The portion of the apparatus now to be described is concerned with the difficult problem of positioning the sides and ends of the casting chamber in proper relation to the pallet.

Along the length of the pallet, on both sides thereof, and along the ends of the pallet, are positioned a plurality of socket blocks denoted by numeral 124. Figure 5 illustrates one such socket in section. These socket blocks are rigidly attached to the pallet by any suitable means. The outside shape of the blocks is of no importance except that the top surface of each is flat and must lie in the same plane as the top side of the pallet. In the body of each socket block a cavity is provided which is denoted by numeral 126. Cavity 126 takes the shape of a half-cylinder in vertical configuration as indicated by numeral 128. The bottom of the cylinder merges into a cup denoted by numeral 130. Cup 130 takes the shape of a quadrant of a sphere.

On the outer surfaces at points adjacent the lower edges of the sidewalls and ends of the casting chamber and corresponding with the location of the socket blocks, there is provided a corresponding member for cooperation with the socket of the socket block just described. As can be seen in Figure 5, designated by numeral 131, these members are generally L-shaped with one leg of the L-shape to complement exactly the shape of the socket just described. Figure 3 illustrates the elements partly in section in juxtaposition.

The cooperating members just described are carefully machined and are of heavy construction. They have been found especially serviceable in positioning the sidewalls and pallet. Furthermore, they are self cleaning insofar as sand and gravel or the like is concerned.

The elements now to be described effect precise relative positioning of the top, sidewalls and endwalls of the casting chamber. A number of identical sets of cooperating parts perform this purpose, one of which set will be described in detail.

Along the sidewalls and endwalls at points adjacent the upper edges thereof, there are a number of horizontally extending flanges denoted by numeral 132. Figures 5, 6 and 7 best illustrate this portion of the apparatus. Referring to Figure 5, numeral 132 denotes two of such flanges. On the top surface of each of the flanges is a hemispherical bearing surface denoted by numeral 134. The flanges are rigidly attached to the walls and are of heavy structure.

A series of L-shaped members are attached along the edges of the top at points to cooperate in a manner hereinafter described with the flange members just described. As best shown in Figure 5, numeral 136 denotes the L-shaped member and illustrates its attachment to the top of the casting chamber as indicated by numeral 138. As can be seen, one leg of the L-shaped member seats in vertical position behind an upraised portion of the top, a shoulder denoted by numeral 140. The other leg of the L extends horizontally and is provided with a cylindrical bore extending vertically as indicated by numeral 142. Positioned within the bore is a rod denoted by numeral 144. Rod 144 carries a block denoted by numeral 146. The underside of block 146 is provided with a spherical concavity as indicated by numeral 148. A coil spring denoted by numeral 152 is positioned about the rod and bears against the undersurface of flange 136 and upon the upper surface of block 146. The rod is provided with a head denoted by numeral 150, and when the top is not in position within the chamber, spring 152 maintains the rods in a position such that the head is fully drawn down against the upper surface of the flange 136. The spring just described is for this purpose only and offers practically no resistance to the hydraulic units which manipulate the top. When the top is in position within the casting chamber, as in Figure 3, the spherical cavity in the block 148 seats upon the complementary spherical surface on the flange of the sidewalls. These abutting structures are carefully machined as is the rod which slides in the bearing surface in flange 136. There should be a minimum of play between the bore and the rod so that the rod may thereby maintain the top in perfect alignment relative to the sidewalls and endwalls.

Referring now to Figure 3, numeral 154 denotes an axle of which there are four, as can be seen in Figures 1 and 2. These axles are mounted upon and between opposite stanchions 46. Positioned upon each axle is a pair of flanged wheels denoted by numeral 156. It will be noted that the wheels are located directly beneath the downwardly extending flanges (denoted by numeral 158) on the pallet 22. Reference to Figure 5 will reveal the wheels and pallet flanges in working position.

It will be recalled that the frame and stanchions move upwardly when the hydraulic jack is extended. As the axles are mounted upon the stanchions, they too move upwardly when the jack is extended. However, the pallet does not so move until the wheels 156 contact the flanges 158 and then only sufficiently to lift the pallet from stands 30. This arrangement avoids the necessity of manually lifting the heavily-loaded pallet, or hoisting it to a storage position, for when the pallet is on the wheels, as in Figure 5, it may be easily pushed onto a suitably-positioned trackway which will lead it to a point of storage. As will appear later, however, this is not the primary purpose of mounting the frame upon the jack.

In the course of molding concrete products by high compression, difficulty has been encountered in forming uniformly smooth surfaces, particularly on the top side. This lack of smoothness appears to be caused by air pockets or shallow air lakes which form on top of the mass adjacent the top of the chamber, i. e., between the plastic mass and the top. The air, it seems, is unable to escape and, as a result, shallow depressions appear in the surface of the finished product. It has been found that this difficulty can be substantially eliminated by the use of a suction apparatus, now to be described.

Referring to Figures 1 and 2, numeral 160 denotes an inverted channel sealed to the top 26 of the casting chamber. The ends of the channel are closed. Along the length of the channel at as many points as desired, outlet means are provided as at numeral 162 to which is attached a source of suction, not shown. As many channels as are desired or made necessary by the width of the top may be provided. In the drawings, two channels are illustrated. The construction is further illustrated in Figures 5, 11, 12 and 13. Along the length of the top and immediately beneath the channel is a series of depressions in the shape of a countersink denoted by numeral 164. These depressions are to a depth just above the underside of the top. Around the sloping walls of the depressions a series of minute holes denoted by numeral 166 are drilled through to the underside of the top. The holes extend outwardly in all directions from the depressions and to a considerable distance. It is contemplated that the length of the longer hole may be about two inches. When the top is in position on the plastic mass under pressure and suction is applied, air is drawn from the area surrounding each set of minute holes 166, through the holes into the channel 160 and thence through outlets 162. The holes may be kept clean by blowing air through them when the top is removed. It has been found that each depression will evacuate an area of from ten to fifteen inches in diameter. Thus, the depressions should be spaced to evacuate overlapping areas for optimum results. High suction is not necessary or desirable. Low suction will readily remove air, especially as it is under pressure from the top. High suction will result in quickly clogging the small holes and slowing the air evacuation.

Before proceeding to describe a full cycle of operation of the apparatus, a few remaining elements of the apparatus require designation.

Referring to either Figures 3, 4 or 5, it will be noted that cross bar 96 is provided with an upstanding stop-block as designated by numeral 168, which block is positioned adjacent the upstanding bar 95. The purpose of the stop-block, of which there are two on each cross bar, is to prevent bar 95 from rotating inwardly on its pivot point, which pivot point, as can be seen, is on the cross bar and is designated by numeral 170.

It will be noted also that bars 95 are provided with a series of holes as at numeral 172 in order to permit their being repositioned relative to the cross bars so that locking engagement can be made while casting in chambers of varying depth.

Spring 174 normally maintains bar 95 in vertical position but whenever the sides to the casting chamber are withdrawn, bars 95 may rotate outwardly to whatever extent the sidewalls are withdrawn.

It will be appreciated that as the frame and all of the apparatus that is carried thereby is mounted upon a cylindrical hydraulic jack, it may be rotated relative to the vibrating table and the pallet. This is desirable as it permits a pallet to be received upon rollers 156 from one of several possible tracks without manually lifting or hoisting the pallet at any time. Likewise, a pallet carrying a concrete product may be delivered to one of several tracks as desired or required by the type of storage system that is employed in a given manufacturing plant. However, once the pallet is received upon the rollers, the entire frame and its associated apparatus must be returned to a position in exact alignment with the stands 30 and the vibrating table. This is accomplished most expeditiously in the apparatus of this invention by elements 176 and 178. Referring to Figure 2, numeral 176 denotes an inverted, hollow cone-like structure, having a flared portion as at numeral 180. Numeral 178 denotes upstanding spires firmly mounted in the base 36. These spires conform generally to the interior of the narrow portion of the cones 176 so that when a cone is seated to its full depth upon the spire, the entire frame structure is prevented from rotation to any extent inasmuch as the cone-shaped elements are rigidly mounted on the base frame 44. Figure 2 shows a pair of each of these elements, they being located so as to cause the long axis of the frame to coincide with that of the pallet when it is seated upon the stands 30 and in position for molding. The flared portion of cones 176 facilitate guiding of the cones down upon the spires. Obviously, there may be as many cooperating spires and cones as desired.

Seated upon the upper flanges of each sidewall is a small track segment denoted by numeral 182. These track segments can be seen in Figure 3. They run the full length of the casting chamber and are for the purpose of mounting rolling or troweling equipment in position above the plastic mass.

It is to be understood that all of the hydraulic cylinders referred to in the foregoing description are of the double acting type. The lead lines, in practice, are all connected through a central station to their source of pressure. The central station is under the control of a single individual who manipulates the various elements of the apparatus from the time the pallet is delivered to the rollers for seating upon the vibrating tables to the time when the molded product and pallet is ready for discharge to a point of storage.

In order that a more thorough understanding of the apparatus of this invention may be had, its manner of use and the method of casting which it permits will now be explained, in connection with molding of a concrete block.

Figure 5 of the drawing illustrates the apparatus in open position with the pallet seated upon the rollers, the jack having been extended to raise the pallet for the discharge of a molded product. Upon removal of the pallet and its molded product from the rollers, a clean pallet is positioned upon the rollers and thereafter the jack retreats, lowering the pallet to the vibrating table and carrying the frame and walls of the casting chamber down to a point of horizontal alignment around the pallet. It will be understood that the sidewalls and the endwalls, as well as the top and pallet, have been shown in reation to each other as forming a predetermined size and type of block. This is, of course, for illustrative purpose only, as obviously the device may be easily adapted to any size or type of product. At this point the side and endwalls are moved into position with respect to the pallet so as to form a casting chamber. This position is shown in Figure 4 of the drawing. The concrete mass is then deposited in the chamber and is vibrated and may be rolled to cause the mass to flow out and generally assume the shape of the chamber. When this has happened, vibrating is stopped and the top is brought into position upon the mass. The hydraulic units that are associated with the top are then actuated to effect engagement of the locking mechanism with bars 95. Once the locking engagement is effected the vibrators are again started in motion and the pressure on the top is increased, to the desired point. Pressure is increasingly applied until it is found that the mass will no longer accept compression. During this time the suction apparatus has been in operation to remove air that collects underneath the top. At this point the product is ready for removal from the chamber.

The suction underneath the top is released and if desired air may be forced underneath the top to effect breaking of the seal between the top and the concrete. The locking mechanism is released and the top is withdrawn from the casting chamber and swung back to the position shown in Figure 5. This leaves the mass seated upon the vibrating table with the sidewalls and endwalls in the position shown in Figure 4. At this point another important aspect of the invention becomes observable.

With the apparatus in the position just described, the main hydraulic jack underneath the frame is put under pressure to move the entire frame upwardly carrying with it the side and endwalls. As the walls travel upwardly about the plastic mass, they leave it in smooth, upstanding condition as if the mass had been smoothed by a trowel. In fact, action of the wall is a perfect troweling effect. No portion of the walls of the mass are torn away and all edges are left clean and sharp. Heretofore it has been common practice to leave the plastic mass confined within its wall until it is set to such point that the walls can be pulled or stripped off. This was necessary because if the walls were pulled away prior to a long period of setting, the surface of the product was left in a ragged condition. Thus a great deal of equipment was necessary for large scale operation as the setting periods of the concrete before the walls could be stripped down was at least about 8 hours.

The movement of the frame continues upwardly about the pallet until the rollers contact the underside of the pallet and lift it from the vibrating table. The mass is then in the position shown in Figure 5 and is ready for discharge to a point of storage.

The operation just described requires about an hour.

It will be understood that in building an apparatus in accordance with the teachings of this invention many departures may be made from the specific descriptions set forth herein. The description is not intended to be limited to the exact details of the drawings or the description. For example, instead of employing a centrally-located hydraulic jack, a similar device might be positioned at the four corners of the frame to effect its upward and downward movement.

Furthermore, the device may be adapted to form innumerable differently-shaped products, it being only necessary to fit into the device, whether it be on the top, the sidewalls, the endwalls or the pallet, molding pieces which will impart the desired configuration to the product.

It is also desired to point out that a product with hollows may be formed with the device of this invention. As is shown in Figures 9 and 10, a sidewall is provided with inwardly-extending core members as designated by numeral 184. As can be seen in the drawing, the core member is mounted upon a bolt which passes through the sidewall. When a product is formed utilizing these core members, prior to vertical movement of the sidewalls of the casting chamber, the bolts are withdrawn and therefore the sidewalls may slide upwardly without disturbing the core members. The core members may thereafter be removed as desired.

Having described and illustrated a specific embodiment of this invention and pointed out that modifications may be made to the described embodiment without departing from the spirit of the invention, I claim the invention as follows.

What is claimed is:

1. Molding apparatus especially useful in forming concrete products comprising a pallet, supporting means for said pallet, a pair of sidewalls and endwalls for cooperation with said pallet to form a casting chamber; means for effecting movement of said side and endwalls to and from a cooperative position with said pallet; a top closure for said casting chamber; means for delivering pressure to said casting chamber to effect compression of its contents; means for effecting vertical movement of said side and endwalls from a position of cooperation with said pallet; supporting means for said pressure means independent of said pallet supporting means; said pressure means having a thrust transferring system associated therewith independent of said supporting means for said pressure means for transferring upward thrust from said pressure means; said thrust transfer system including at least one extending member attached to said pressure means; and means removed from said pressure means for holding said member against upward movement.

2. A molding device especially useful in forming concrete products comprising a pallet, means to support said pallet, vibratory means imparting vibratory motion to said pallet; a pair of sidewalls and endwalls for cooperation with said pallet to form a casting chamber; means for effecting movement of said sidewalls and endwalls to and from a cooperative position with said pallets; a top for closing said casting chamber and means for delivering pressure to said casting chamber to effect compression of its contents; means for effecting vertical movement of said sidewalls and endwalls from a position of cooperation with said pallet; supporting means for said pressure means independent of said pallet supporting means; said pressure means having a thrust transferring system associated therewith independent of said supporting means for said pressure means for transferring upward thrust from said pressure means; said thrust transfer system including at least one extending member attached to said pressure means; and means removed from said pressure means for holding said member against upward movement.

3. A molding device especially useful in forming concrete products comprising a pallet, means to support said pallet, vibratory means for imparting vibratory motion to said pallet; a pair of sidewalls and endwalls for cooperation with said pallet to form a casting chamber; a frame surrounding said pallet; means on said frame supporting said sidewalls and endwalls; means for effecting movement of said sidewalls and endwalls to and from a cooperative position with said pallet; a top for closing said casting chamber and means for delivering pressure to said casting chamber to effect compression of the contents thereof; means for effecting vertical movement of said sidewalls and endwalls from a position of cooperation with said pallet; supporting means for said pressure means independent of said pallet supporting means; said pressure means having a thrust transferring system associated therewith independent of said supporting means for said pressure means for transferring upward thrust from said pressure means; said thrust transfer system including at least one extending member attached to said pressure means; and means removed from said pressure means for holding said member against upward movement.

4. Molding apparatus especially useful in forming concrete products comprising a pallet, supporting means for said pallet, a pair of sidewalls and endwalls for cooperation with said pallet to form a casting chamber; means for effecting movement of said sidewalls and endwalls to and from a cooperative position with said pallet; a top closure for said casting chamber; means for delivering pressure to said casting chamber to effect compression of its contents; means for effecting vertical movement of said sidewalls and endwalls from a position of cooperation with said pallet; supporting means for said pressure means independent of said pallet supporting means; said pressure means having a thrust transferring system associated therewith independent of said supporting means for said pressure means for transferring upward thrust from said pressure means; said thrust transfer system including a pair of oppositely positioned arms extending from said pressure means; a link extending from each of said arms; and means oppositely located relative to said casting chamber and removed from said pressure means for holding said links against upward movement.

5. A molding device especially useful in forming concrete products comprising a pallet, means to support said pallet, vibratory means imparting vibratory motion to said pallet; a pair of sidewalls and endwalls for cooperation with said pallet to form a casting chamber; means for effecting movement of said sidewalls and endwalls to and from a cooperative position with said pallet; a top for closing said casting chamber and means for delivering pressure to said casting chamber to effect compression of its contents; means for effecting vertical movement of said sidewalls and endwalls from a position of cooperation with said pallet; supporting means for said pressure means independent of said pallet supporting means; said pressure means having a thrust transferring system associated therewith independent of said supporting means for said pressure means for transferring upward thrust from said pressure means; said thrust transfer system including a pair of oppositely positioned arms extending from said pressure means; a link extending from each of said arms; and means oppositely located relative to said casting chamber and removed from said pressure means for holding said links against upward movement.

6. Molding apparatus as in claim 5 wherein said vibratory means is insulated against the transmission of vibratory energy to said pallet supporting means and said holding means are anchored to said vibratory means.

7. Molding apparatus especially useful in forming concrete products comprising a pallet; means to support said pallet comprising at least a pair of tables; a crossbar on each table resiliently insulated therefrom; a vibrator on each said crossbar, said crossbars having thereon means for receiving said pallet; a frame positioned relative to said pallet; means associated with said frame for moving it vertically; a pair of sidewalls mounted on said frame for horizontal movement; a pair of endwalls supported by said sidewalls; means to effect movement of said side and endwalls to and from a position relative to said pallet whereat a casting chamber is formed; a top for said chamber; means to support said top relative to said chamber; at least one cage on said top supporting means; pressure means slidably mounted in said cage and associated with said top; delivering pressure to said top; a thrust transfer system associated with said pressure means; said system comprising a pair of arms extending from said pressure means and a link extending from and pivotally mounted upon each said arm; latching means carried by said crossbar detachably engaging said link and holding it against vertical movement; and means for moving said link to and from latching position.

8. Molding apparatus as claimed in claim 7 wherein said last means comprises a link pivotally mounted upon said cage and pivotally attached to the first said link.

9. Molding apparatus as in claim 7 wherein said frame moving means, said endwall and sidewall moving means and said pressure means are hydraulic means.

10. Molding apparatus as in claim 8 wherein said frame moving means, said endwall and sidewall moving means and said pressure means are hydraulic means.

11. Molding apparatus especially useful in forming concrete products comprising a pallet, supporting means for said pallet, a pair of sidewalls and endwalls for cooperation with said pallet to form a casting chamber; means for effecting movement of said sidewalls and endwalls to and from a cooperative position with said pallet; a top closure for said casting chamber; means for delivering pressure to said casting chamber to effect compression of its contents; means for effecting vertical movement of said sidewalls and endwalls from a position of cooperation with said pallet and a product in process to a point above the said product and removed therefrom.

12. A molding device especially useful in forming concrete products comprising a pallet, means to support said pallet, vibratory means imparting vibratory motion to said pallet; a pair of sidewalls and endwalls for cooperation with said pallet to form a casting chamber; means for effecting movement of said sidewalls and endwalls to and from a cooperative position with said pallets; a top for closing said casting chamber and means for delivering pressure to said casting chamber to effect compression of its contents; means for effecting vertical movement of said sidewalls and endwalls from a position of cooperation with said pallet and a product in process to a point above the said product and removed therefrom.

13. A molding device especially useful in forming concrete products comprising a pallet, means to support said pallet, vibratory means for imparting vibratory motion to said pallet; a pair of sidewalls and endwalls for cooperation with said pallet to form a casting chamber; a frame surrounding said pallet; means on said frame supporting said sidewalls and endwalls; means for effecting movement of said sidewalls and endwalls to and from a cooperative position with said pallet; a top for closing said casting chamber and means for delivering pressure to said casting chamber to effect compression of the contents thereof; and means for effecting vertical movement of said sidewalls and endwalls from a position of cooperation with said pallet and a product in process to a point above the said product and removed therefrom.

14. Molding apparatus especially useful in forming concrete products comprising a pallet; means to support said pallet; a frame positioned relative to said pallet; means associated with said frame for moving it vertically and away from said pallet; a pair of sidewalls mounted on said frame for horizontal movement; a pair of endwalls supported by said sidewalls; means to effect movement of said sidewalls and endwalls to and from a position relative to said pallet whereat a casting chamber is formed; and a top for said chamber, and means to deliver pressure to said top.

15. Molding apparatus including a casting chamber; means for delivering pressure to said chamber; supporting means for said pressure means; said pressure means having a thrust transfer system associated therewith independent of said supporting means for said pressure means for transferring upward thrust from said pressure means; said system including at least one extending member attached to said pressure means and means removed from said pressure means for holding said member against upward movement.

16. Molding apparatus including a casting chamber; means for delivering pressure to said chamber; supporting means for said pressure means; said pressure means having associated therewith independent of said supporting means for said pressure means a thrust transfer system for transferring upward thrust from said pressure means; said system including a pair of oppositely positioned arms extending from said pressure means; a link extending from each of said arms; and means oppositely located relative to said casting chamber and removed from said pressure means for holding said links against upward movement.

References Cited in the file of this patent

UNITED STATES PATENTS

| | | |
|---|---|---|
| 874,366 | Layfield et al. | Dec. 17, 1907 |
| 876,322 | Brodie | Jan. 14, 1908 |
| 1,030,389 | Crossley | June 25, 1912 |
| 1,921,003 | Romie | Aug. 8, 1933 |
| 2,057,466 | Willetts | Oct. 13, 1936 |
| 2,298,074 | Straub | Oct. 6, 1942 |
| 2,496,016 | Nelson | Jan. 31, 1950 |
| 2,529,066 | Annas | Nov. 7, 1950 |